(12) United States Patent
Smith et al.

(10) Patent No.: US 12,231,421 B2
(45) Date of Patent: *Feb. 18, 2025

(54) WIRELESS LAN (WLAN) PUBLIC IDENTITY FEDERATION TRUST ARCHITECTURE

(71) Applicant: Cisco Technology, Inc., San Jose, CA (US)

(72) Inventors: Malcolm Muir Smith, Richardson, TX (US); Bart Brinckman, Nevele (BE); Mark Grayson, Berkshire (GB); Jerome Henry, Pittsboro, NC (US); Matthew Stephen MacPherson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,337

(22) Filed: Aug. 8, 2023

(65) Prior Publication Data

US 2023/0388288 A1    Nov. 30, 2023

Related U.S. Application Data

(63) Continuation of application No. 17/571,297, filed on Jan. 7, 2022, now Pat. No. 11,765,153, which is a
(Continued)

(51) Int. Cl.
*H04W 12/06* (2021.01)
*G06F 21/40* (2013.01)
(Continued)

(52) U.S. Cl.
CPC ...... *H04L 63/0815* (2013.01); *H04L 63/0807* (2013.01); *H04L 63/102* (2013.01); *H04W 12/06* (2013.01)

(58) Field of Classification Search
CPC . H04L 63/0892; H04L 9/3231; H04L 63/205; H04L 63/0807; H04L 9/3263;
(Continued)

(56) References Cited

U.S. PATENT DOCUMENTS

| 8,412,931 | B2 | 4/2013 | Vedula et al. |
| 8,761,051 | B2 | 6/2014 | Brisebois et al. |

(Continued)

FOREIGN PATENT DOCUMENTS

| EP | 2194482 A1 | 6/2010 |
| WO | 2014011997 A1 | 1/2014 |
| WO | 2014176539 A1 | 10/2014 |

OTHER PUBLICATIONS

International Search Report and Written Opinion from the International Searching Authority, dated Apr. 20, 2021, 10 pages, for corresponding International Patent Application No. PCT/US2021/013040.

*Primary Examiner* — Mohammad A Siddiqi
(74) *Attorney, Agent, or Firm* — Polsinelli P.C.

(57) ABSTRACT

The disclosed technology relates to a process of evaluating any number of different identity providers (IDPs) and their respective set of credentials that are used to authenticate corresponding users to assist with the onboarding of the different IDPs in connection with Wi-Fi identity federations. In particular, the process allows a person's electronic identity and attributes (stored across one or more IDPs) to be determined once using a standard. Once trust has been established for the user, that trust can then be utilized across a number of different systems (e.g., Single-sign on). The same trust determination can be used without the need for the authenticity of the user identity to be re-evaluated with each new access request.

20 Claims, 5 Drawing Sheets

Related U.S. Application Data continuation of application No. 16/742,576, filed on Jan. 14, 2020, now Pat. No. 11,258,779.

(51) Int. Cl.
*H04L 9/40* (2022.01)
*H04L 29/06* (2006.01)

(58) Field of Classification Search
CPC ... H04L 63/102; H04L 63/0815; H04L 9/088; H04L 9/3213; H04L 9/3226; H04L 63/10; H04W 12/67; H04W 12/08; H04W 12/06
See application file for complete search history.

(56) References Cited

U.S. PATENT DOCUMENTS

| | | | |
|---|---|---|---|
| 9,485,248 B2 | 11/2016 | Schmoyer et al. | |
| 9,836,595 B1 | 12/2017 | Goldberg et al. | |
| 9,923,927 B1 | 3/2018 | McClintock et al. | |
| 10,038,692 B2 | 7/2018 | Choyi et al. | |
| 10,057,247 B2 | 8/2018 | Jakobsson | |
| 10,091,188 B2 | 10/2018 | Xiao et al. | |
| 11,258,779 B2 * | 2/2022 | Smith | H04L 63/0892 |
| 11,765,153 B2 * | 9/2023 | Smith | H04W 12/06 726/8 |
| 2006/0053296 A1 * | 3/2006 | Busboom | H04L 63/20 726/4 |
| 2007/0174454 A1 | 7/2007 | Mitchell et al. | |
| 2012/0179905 A1 * | 7/2012 | Ackerly | H04L 63/101 713/155 |
| 2013/0007868 A1 * | 1/2013 | Hoggan | H04L 63/0815 726/8 |
| 2013/0125226 A1 * | 5/2013 | Shah | H04W 12/0431 726/7 |
| 2013/0311771 A1 * | 11/2013 | Hoggan | H04L 9/3268 713/156 |
| 2015/0264020 A1 * | 9/2015 | Ackerly | H04L 63/0428 713/168 |
| 2015/0264051 A1 | 9/2015 | Hoggan | |
| 2016/0087957 A1 | 3/2016 | Shah et al. | |
| 2017/0324750 A1 * | 11/2017 | Khan | H04W 12/068 |
| 2017/0366970 A1 | 12/2017 | Yu | |
| 2018/0060562 A1 | 3/2018 | Waltermann et al. | |
| 2019/0007406 A1 * | 1/2019 | Choyi | H04L 63/105 |
| 2019/0074982 A1 | 3/2019 | Hughes | |
| 2019/0132326 A1 | 5/2019 | Spradlin | |
| 2019/0228178 A1 * | 7/2019 | Sharma | H04L 63/0853 |
| 2020/0021440 A1 | 1/2020 | Maniyar | |
| 2020/0163013 A1 * | 5/2020 | Grayson | H04W 48/18 |
| 2020/0195436 A1 | 6/2020 | Khan | |
| 2020/0380115 A1 | 12/2020 | Knight et al. | |
| 2021/0194883 A1 * | 6/2021 | Badhwar | H04L 63/107 |

\* cited by examiner

WIRELESS LAN (WLAN) PUBLIC IDENTITY FEDERATION TRUST ARCHITECTURE

CROSS-REFERENCE TO RELATED APPLICATION

This application is a continuation of U.S. Non-Provisional patent application Ser. No. 17/571,297, filed Jan. 7, 2022, which is in turn a continuation of, and claims priority to U.S. Non-Provisional patent application Ser. No. 16/742,576, filed Jan. 14, 2020, now U.S. Pat. No. 11,258,779 the contents of which are hereby expressly incorporated by reference in their entirety.

TECHNICAL FIELD

The subject matter of this disclosure relates in general to computer networks, and more specifically to a wireless LAN (WLAN) public identity federation trust architecture.

BACKGROUND

Wi-Fi identity federations (such as EDUroam, AnyRoam, Cisco's OpenRoaming) aim to connect mobile devices to Wi-Fi networks automatically. This automated connection is implemented by creating a link between identity providers (IDPs), service providers, and enterprises so that credentials and access can be shared. In order to have the automated access, the Wi-Fi identity federations need to validate an authenticity of the user in an efficient and low-cost manner while preserving the integrity of the credentials used during the authentication process. With classic mobile-operator federations (e.g., WRX), trust in the identity is implicit and is based on the reputation of the identity provider (IDP). However, in a federation with many lesser-known or non-traditional IDPs, the intrinsic value of the identity is less certain.

Issues arise when the access providers are required to onboard any number of different lesser-known or non-traditional IDPs with different set of credentials which cannot be easily or reliably assessed. It may not be feasible to instruct each access provider how to specifically evaluate credentials for each user for each of the lesser-known or non-traditional IDPs. Therefore, these issues limit what IDPs may typically be accepted by different access points.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

BRIEF DESCRIPTION OF EXAMPLE EMBODIMENTS

Figure 1:
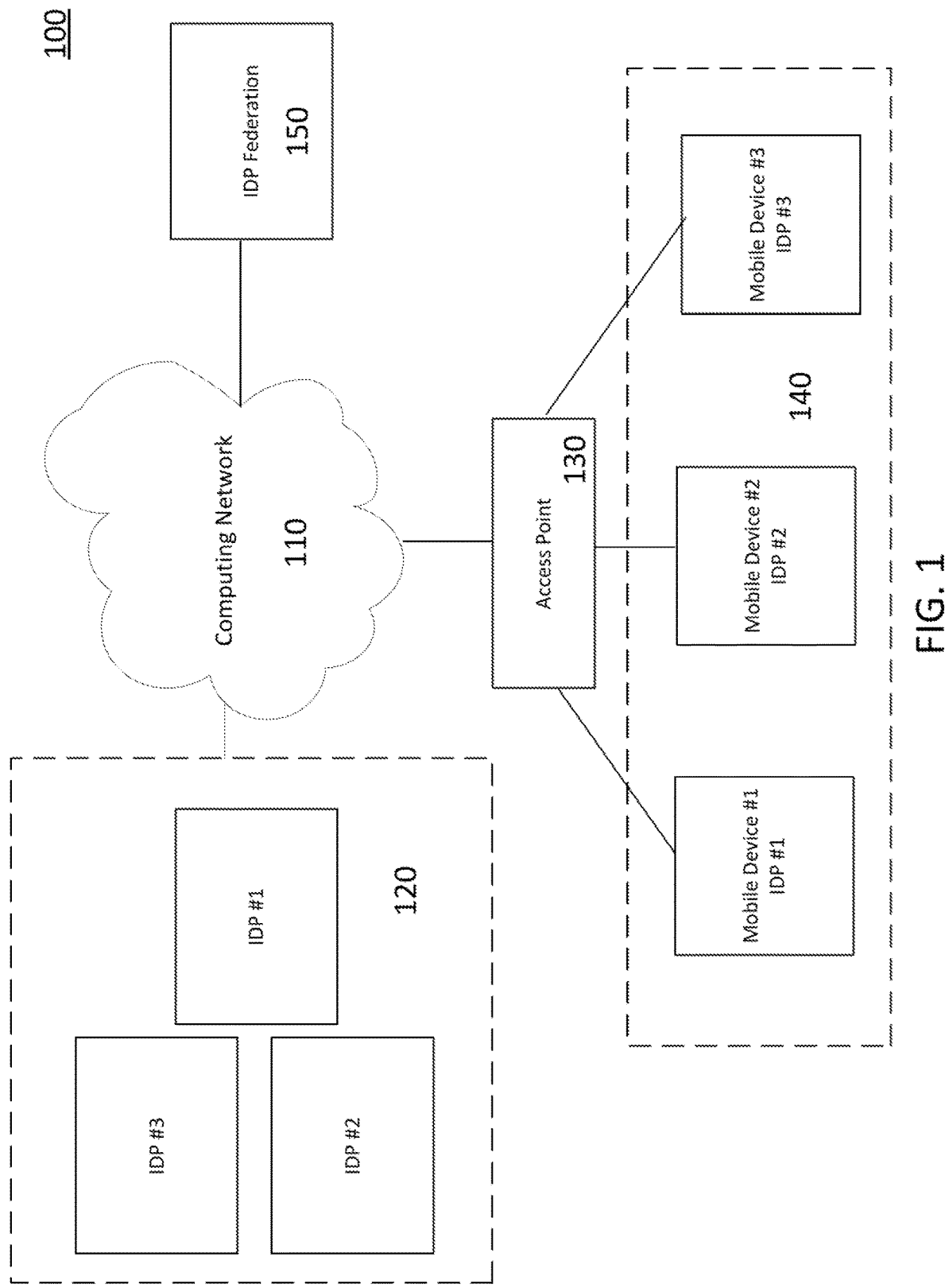
FIG. 1 illustrates an example deployment of an identity federation trust architecture in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are computer-implemented methods, computer-readable media, and systems for automatically authenticating a user device on a network. First, a request from the user device is received whereby the request pertains to access of the network via an access point. The request is transmitted from the user device to the access point using an identity provider profile associated with the IDP service. Next, the access point evaluates a credential strength of the user device. The credential strength of the user device is calculated based on how the identity provider associated with the user device authenticates its own users that are associated with the identity provider service. Based on the evaluation, a credential strength value is assigned to the user device. Based on the assigned credential strength value, access to the network can be provided presuming that the user device satisfies a pre-determined credential strength value threshold.

In some embodiments, the credential strength of the identity provider is calculated by identifying all the possible authentication methods that are accepted by the access point. Next, the pre-determined weights associated with each of the plurality of acceptable authentication methods are retrieved. Last, a value representative of the credential strength of the identity provider associated with the user device is outputted. The value is based on an aggregation of the pre-determined weights associated with the authentication methods corresponding to the identity provider service.

In another embodiment, the evaluation of the credential strength may also include identifying the alternative authentication methods that can be used where each of the alternative authentication methods are also assigned a pre-determined weight. The information related to the credential strength using the alternative authentication methods is requested by the access point when an initial evaluation of the credential strength of the identity provider service associated with the user device does not satisfy the pre-determined threshold. The access point will then evaluate the credential strength of the user device based on the alternative authentication methods across two or more different identity providers associated with the user device.

In one embodiment, the credential strength values assigned to the user devices are used by the user devices to access the network (e.g., Wi-Fi) via different access points. The access can be provided to each user device without the need to re-evaluate the credential strength of the user device at each different access point. In another embodiment, the credential strength values assigned to the user devices are used only by the network (e.g., Wi-Fi) containing different access points to determine access privilege.

In an embodiment, example credentials that the identity provider can use to authenticate the identity of users using the identity provider service include one or more of user name/password, authorization token, device certificate, or SIM. In another embodiment, the example credentials can also use one or more of email, mobile phone, government identification, physical identification, local verification, or biometrics to further authenticate the identity of users using the identity provider service.

In another embodiment, the credential strength of the user device can decay after a pre-determined period of time. The extent of the decay on the credential strength of the user device may be based on different decay weights.

In some embodiments, an identity federation (or some other third-party) can generate the pre-determined weights associated with each of the plurality of authentication methods. These weights are used to calculate the credential strength values of the identity providers associated with the user devices requesting access to the network.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, the present disclosure covers a proposed solution for onboarding any number of different IDPs associated with the Wi-Fi identity federations. The purpose of the federations is to link a person's electronic identity and attributes (that may be stored across one or more different identity management systems) so that the user's trust can be determined once and used across multiple systems (e.g., Single sign on). The solution described herein pertains to assessing/evaluating any number of different IDPs and their respective set of credentials that are used to authenticate corresponding users in order to 1) provide a means for validating a 'strength' of each identity requesting access to an access point and 2) ensure that the means of evaluating and granting access to the access points for users is efficient so as not to impede scalability of the public Wi-Fi identity federation.

In order to validate the 'strength' of each IDP within the identity federation, an identity strength rating function is generated. The purpose of the identity strength rating function is to assess (at one time) the quality of the credentials associated with an IDP used to authenticate and proof the identity of users of that IDP. Example credentials may include but are not limited to user email addresses, SMS/phone numbers, government identification, device certificate, authentication tokens, and physical presence/GPS location. Based on the credentials (or combination of credentials) used by the IDP to authenticate the identity of the user, the IDP can be assigned a credential strength value from using the identity strength rating function.

The credential strength is a function of both the IDP and the methods used by the IDP to ascertain the identity of its users. Therefore, different IDPs are assigned different credential strengths based on the type of credentials that the IDPs use to validate their user identities. For example, a first IDP may utilize an authorization token that is obtained by email validation. A second IDP may rely on the same type of authorization tokens but obtained through SMS verification. Based on the strength values of using an authentication token, email, and/or SMS, a corresponding strength value for the IDP is provided.

Example 'strength' ratings for different credentials that may be used by the IDPs are provided below:
Credential strength:
1=username/password
2=authorization token
3=device certificate
4=SIM
ID proofing:
1=none
2=email
3=mobile phone (SMS/call)
4=government ID
5=government ID+physical ID
6=government ID+physical ID+local verification
6=biometrics By using the example credential strengths above, the aforementioned example first IDP would have a credential strength of 4 by combining the strength values of the authorization token (2) and the use of email (2). In contrast, the second IDP would have a credential strength of 5 by combining the strength values of the authorization token (2) and the use of the mobile phone (SMS) (3). In this way, the strength values for each IDP can be determined based on how the IDP authenticates its respective users.

In other embodiments, the credential strength values for each of the different IDPs may also incorporate decay weights based on when the last validation was performed. For example, an email that was valid when the verification was initially performed (having a 'strength' value of 2) may decrease over time having a value of 1.8 after an extended period of time (e.g., 3 years). The rate of decay for the 'strength' value can be customized based on the importance of having more up-to-date or recent verifications.

The calculated credential strength value is then provided to each of the IDPs in an encrypted manner by, for example, embedding the IDP strength inside the certificate assigned to the IDP by the federation. The IDPs use the strength value in connection with the access point to confirm whether the current credentials used by the IDP are sufficient to authenticate the identity of the user at that access point. Each access point can have different threshold criteria as to what strength level is needed in order to allow access to the use of the associated Wi-Fi network. Each access point can customize the threshold criteria, for example, based on the need for a pre-determined level of security associated with the Wi-Fi network. The calculated strength value can be set by each access point and the determination of whether an IDP's users can be authenticated at the access point is based on the strength values provided to each access point by the IDPs. From the point of view of the access points, the strength values provide a scalable architecture that can easily implement any number of different IDPs (lesser-known or non-traditional) by evaluating the type of credentials used by the IDPs. Furthermore, each access point can customize their requirements and each new access point added to the overall network can do the same.

FIG. 1 illustrates an example deployment 100 of an identity federation trust architecture in accordance with various embodiments of the subject technology. The deployment 100 includes the computing network (e.g., Wi-Fi network) 110 implementing the automated authentication features associated with the IDP federation 150. The different IDPs 120 are also connected to the computing network 110 so that the IDPs 120 can provide their respective credential strengths to the access point 130 as required. The access point 130 (e.g., router) is the means by which the different mobile devices 140 attempt to access the computing network 110. The access point 130 includes the various instructions that pertain to the automated authentication of the users on their mobile devices 140 as described in detail below.

The credential strength for each IDP 120 is stored by the IDP 120. The credential strength of the IDP 120 is provided to the access point 130 as part of a certificate exchange between the IDP and the access point. The credential strengths of the IDPs 120 can be downloaded by each of the access points 130 during its sign-up/onboarding with the computing network 110. In other cases, the access point 130 can retrieve the corresponding credential strengths of the IDPs as needed (e.g., after a first user attempts to access the access point with the IDP).

The IDP federation 150 establishes (and provides upon request to the access point 130) standards associated with the different credentials that can be used to authenticate users associated with an IDP 120. In particular, the IDP federation 150 associates the different credentials with corresponding strength values. The information from the IDP federation 150 is provided to the access points 130 so that evaluation for user mobile devices 140 can be performed to determine whether the IDP credentials associated with the user mobile device 140 are sufficient to satisfy the predetermined threshold values associated with the access point 130.

Figure 2:
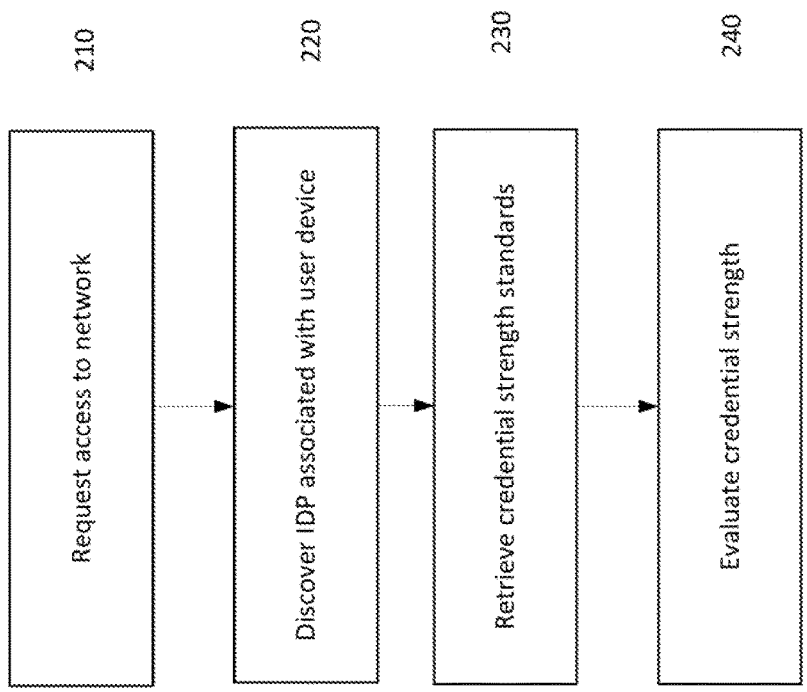
FIG. 2 illustrates a method in accordance with various embodiments of the subject technology.

FIG. 2 illustrates a method 200 in accordance with various embodiments of the subject technology. In particular, the method 200 is implemented from the point of view of an access point (as illustrated in FIG. 1).

In step 210, a user may attempt to access the Wi-Fi network associated with the access point. This attempt to access the Wi-Fi network may be automatically performed by the user's mobile device. For example, as the user enters a building associated with an access point, the user mobile device may automatically communicate with the nearby access point in order to request access to the associated Wi-Fi network. This automatic connection with Wi-Fi networks associated with different access points would allow the user to have a seamless user experience on their mobile device provided that the mobile device is able to access the Wi-Fi networks from each of the respective access points.

In step 220, the access point discovers the identity of the IDP associated with the user mobile device. The identity can be obtained, for example, via a DNS lookup.

In step 230, the access point then communicates with the IDP federation in order to retrieve information relating to the calculation of credential strength. The IDP federation may establish the different strength levels based on the different ways an IDP can authenticate its users. The access point can then use the information and evaluate the credential strength of the IDPs.

Based on the evaluation of the credential strength of the IDP, if the strength value is higher than or equal to a pre-determined threshold, the access point can determine that all the users associated with that IDP (if properly authenticated using the credentials associated with the IDP) can be trusted by the access point. In this way, users associated with the IDP, if properly authenticated with the IDP, can be automatically authorized to connect with the Wi-Fi network associated with the access point.

This relationship between the users associated with the IDP and the access point can continue until, for example, the certificate associated with the IDP is revoked by the access point. In one scenario, the certificate for the IDP may be revoked if the threshold for the access point is changed to a higher level than the credential strength of the IDP. In another scenario, changes in how the credential strength of IDPs is calculated may cause the strength value of the IDP to drop below the threshold associated with the access point. In any case, once the certificate is revoked, users associated with the IDP will no longer be able to automatically connect with the Wi-Fi network associated with the access point.

As noted above, the pre-determined threshold for each access point can be customized. For example, an access point associated with a public venue (e.g., coffee shop) may have a lower strength value compared to a different access point associated with a business. The threshold may correspond to a level of security that an entity associated with the access point may wish to implement.

Figure 3:
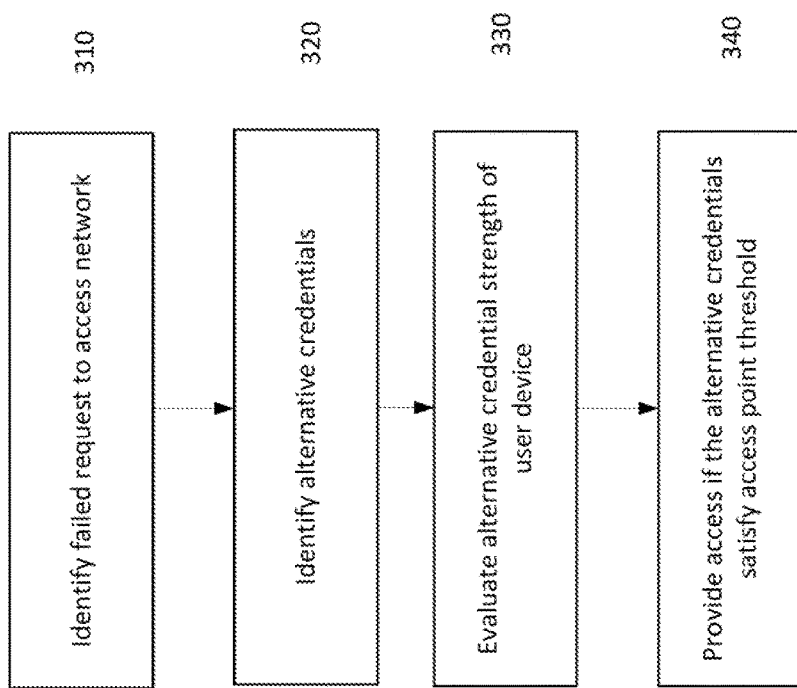
FIG. 3 illustrates another method in accordance with various embodiments of the subject technology.

FIG. 3 illustrates another method 300 in accordance with various embodiments of the subject technology. In particular, the method 300 pertains to identity chaining for users with multiple IDPs. The identity chaining method 300 will be used as a secondary means of allowing a user device to satisfy the IDP credential threshold at the access point.

In some situations the user mobile device may not be capable of accessing the Wi-Fi network via the access point because each of the two or more IDPs associated with the user mobile device do not individually have credentials that have credential strength values that satisfies the strength threshold associated with the access point. As a result, the present disclosure describes a secondary method whereby a process of identity chaining may be used in order to find a combination of credentials from the two or more IDPs associated with the user mobile device that would satisfy the threshold associated with the access point. For example, suppose a first IDP utilizes email authorization while a second IDP utilizes SMS authorization. Individually, each of the IDPs may not meet the predetermined threshold associated with the access point. However, by relying on multiple authorization methods from the different IDPs, the identity of the user can also be affirmed to a degree of certainty that can be determined to be satisfactory similar to if one of the IDPs used credentials that satisfied the predetermined threshold.

The determination of what combination of credentials would be sufficient to alternatively satisfy the predetermined threshold associated with the access point can be customized by each access point. For example, the access point may identify eligible credentials that can be used and the credential strength values of the applicable credentials used by the IDPs associated with the user mobile device can then be aggregated by the access point to see if the predetermined threshold can be satisfied in this alternative manner. Weights can also be incorporated with one or more of the credentials strength values being aggregated.

In step 310, the user mobile device attempts to automatically connect with the Wi-Fi computing network associated with the access point (as described in FIG. 2). However, the user mobile device fails to meet the pre-determined strength value requirement.

In step 320, the access point determines that additional vetting can be performed on the user mobile device. The access point may have a list of different combination of credentials from multiple different IDPs that may be used/accepted to satisfy the pre-determined strength value requirement. The access point then identifies the different IDPs and applicable credentials associated with the user mobile device that corresponds to the list.

In step 330, the access point determines whether the user mobile device possesses at least a combination of credential information from the different IDPs that could be used to satisfy the credential threshold requirement of the access point. The determination can be based on, for example, aggregating the credential strength values of each applicable credential associated with the IDPs on the user mobile device such that the aggregated value meets or surpasses the pre-determined credential threshold value.

Access can then be provided to the user mobile device in step 340. The access may be provided in a same manner as if the user mobile device was authenticated in FIG. 2.

Because the authentication process involves evaluating the credentials and IDPs associated with the user mobile device, this alternative authentication method is to be performed on a per-user basis in situations where the pre-determined threshold for the access point cannot be met initially by the credentials and IDP of the user mobile device (as described above in FIG. 2).

Figure 4:
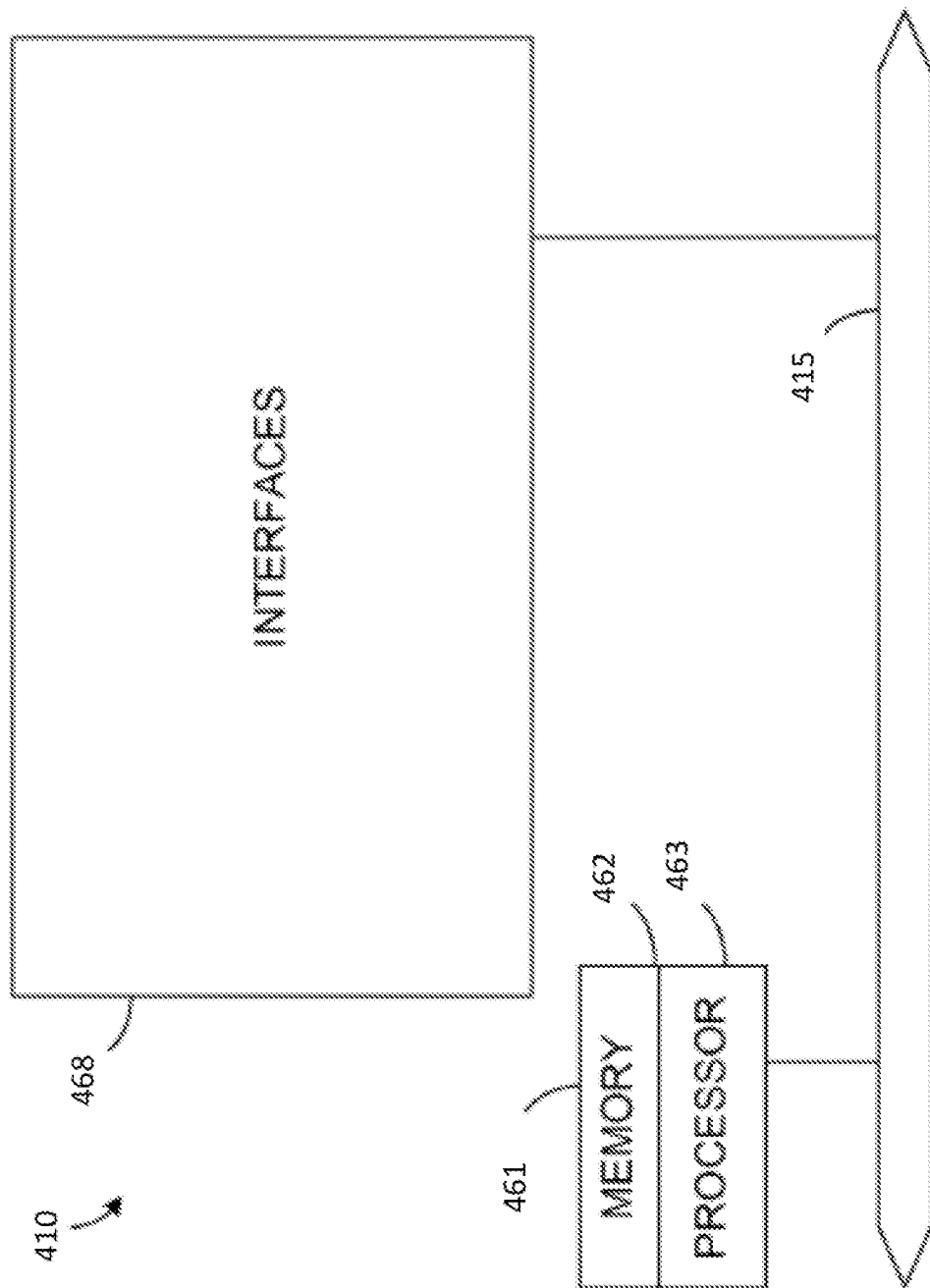
FIG. 4 illustrates an exemplary network device in accordance with various embodiments of the subject technology.

FIG. 4 illustrates an exemplary network device 410 in accordance with various embodiments of the subject technology. Network device 410 includes a master central processing unit (CPU) 462, interfaces 468, and a bus 415 (e.g., a PCI bus). When acting under the control of appropriate software or firmware, the CPU 462 is responsible for performing the steps, for example, illustrated in FIG. 3 and FIG. 4. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of the network device 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 4 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
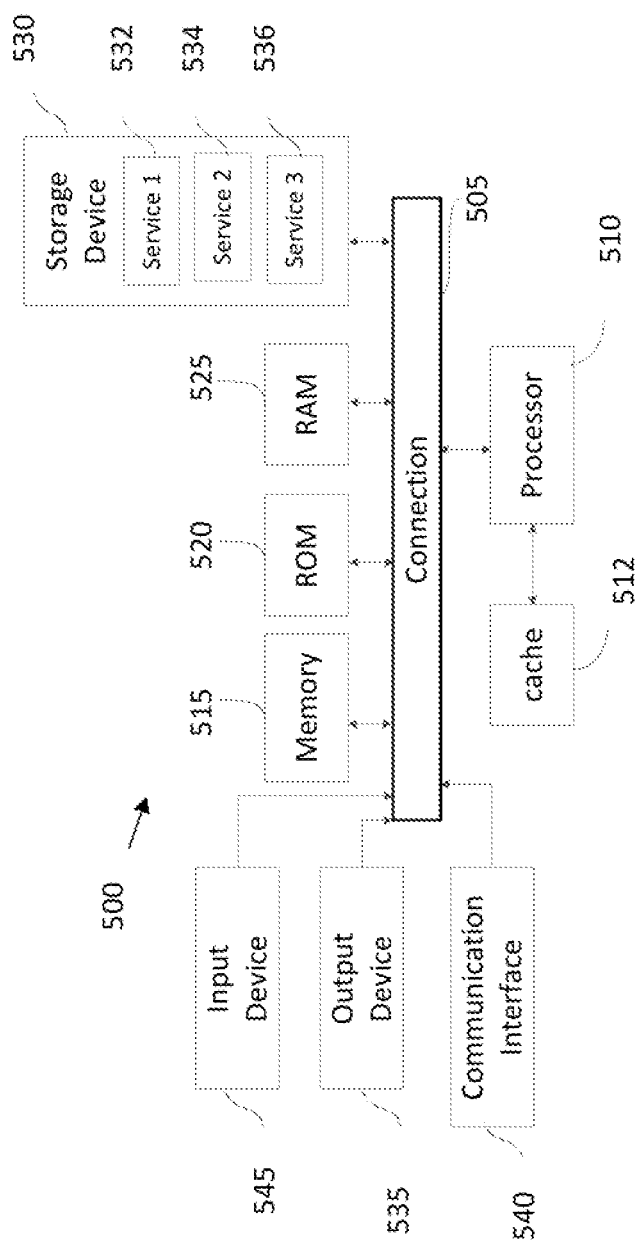
FIG. 5 shows an example computing system in accordance with various embodiments of the subject technology.

FIG. 5 shows an example computing system 500 in accordance with various embodiments of the subject technology. The example computing device can correspond to the computing devices associated with the access point illustrated in FIG. 1. Furthermore, the example computing device may also make up any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for automatically authenticating a user device on a network, the method comprising:
   receiving a request from the user device to access the network via an access point;
   determining an identity provider associated with the user device;
   retrieving, from the identity provider, respective strength ratings of a plurality of authentication methods accepted by the access point and each authentication method of the plurality of authentication methods have respective strength ratings;
   evaluating a credential strength of the user device based on a strength rating of one or more authentication methods of the plurality of authentication methods used by the user device; and
   providing the user device access to the network based on the credential strength of the user device satisfying a pre-determined threshold.

2. The method of claim 1, wherein the evaluating of the credential strength of the user device further comprising:
   identifying a plurality of alternative authentication methods, wherein each alternative authentication method is assigned a pre-determined weight;
   requesting additional information relating to one or more of the plurality of alternative authentication methods when an initial evaluation does not satisfy the pre-determined threshold; and
   evaluating the credential strength of the user device based on the requested additional information across two or more different identity providers associated with the user device.

3. The method of claim 1, wherein the credential strength assigned to the user device is used by the user device to access the network via different access points without the need to re-evaluate the credential strength of the user device.

4. The method of claim 1, wherein the identity provider uses one or more of user name/password, authorization token, device certificate, or SIM to authenticate the user device.

5. The method of claim 1, wherein the identity provider uses one or more of email, mobile phone, government identification, physical identification, local verification, or biometrics to authenticate the user device.

6. The method of claim 1, wherein the credential strength of the user device decays after a pre-determined period of time based on decay weights.

7. The method of claim 1, wherein an identity federation generates the respective strength ratings associated with each of the plurality of authentication methods.

8. A non-transitory computer-readable medium comprising instructions for automatically authenticating a user device on a network, the instructions, when executed by a computing system, cause the computing system to:
   receive a request from the user device to access the network via an access point;
   determine an identity provider associated with the user device;
   retrieve, from the identity provider, respective strength ratings of a plurality of authentication methods accepted by the access point and each authentication method of the plurality of authentication methods have respective strength ratings;
   evaluate a credential strength of the user device based on a strength rating of one or more authentication methods of the plurality of authentication methods used by the user device; and
   provide the user device access to the network based on the credential strength of the user device satisfying a pre-determined threshold.

9. The non-transitory computer-readable medium of claim 8, wherein the evaluating of the credential strength of the user device further comprising instructions, which when executed by the computing system, cause the computing system to:
   identify a plurality of alternative authentication methods, wherein each alternative authentication method is assigned a pre-determined weight;
   request additional information relating to one or more of the plurality of alternative authentication methods when an initial evaluation does not satisfy the pre-determined threshold; and
   evaluate the credential strength of the user device based on the requested additional information across two or more different identity providers associated with the user device.

10. The non-transitory computer-readable medium of claim 8, wherein the credential strength assigned to the user device is used by the user device to access the network via different access points without the need to re-evaluate the credential strength of the user device.

11. The non-transitory computer-readable medium of claim 8, wherein the identity provider uses one or more of user name/password, authorization token, device certificate, or SIM to authenticate the user device.

12. The non-transitory computer-readable medium of claim 8, wherein the identity provider uses one or more of email, mobile phone, government identification, physical identification, local verification, or biometrics to authenticate the user device.

13. The non-transitory computer-readable medium of claim 8, wherein the credential strength of the user device decays after a pre-determined period of time based on decay weights.

14. A system for automatically authenticating a user device on a network, the system comprising:
   at least one processor; and
   a non-transitory computer-readable medium storing instructions that, when executed by the at least one processor, cause the system to:
   receive a request from the user device to access the network via an access point;
   determine an identity provider associated with the user device;
   retrieve, from the identity provider, respective strength ratings of a plurality of authentication methods accepted by the access point and each authentication method of the plurality of authentication methods have respective strength ratings;
   evaluate a credential strength of the user device based on a strength rating of one or more authentication methods of the plurality of authentication methods used by the user device; and
   provide the user device access to the network based on the credential strength of the user device satisfying a pre-determined threshold.

15. The system of claim 14, wherein the evaluating of the credential strength of the user device further comprising instructions, which when executed by the at least one processor, causes the system to:
   identify a plurality of alternative authentication methods, wherein each alternative authentication method is assigned a pre-determined weight;
   request additional information relating to one or more of the plurality of alternative authentication methods when an initial evaluation does not satisfy the pre-determined threshold; and
   evaluate the credential strength of the user device based on the requested additional information across two or more different identity providers associated with the user device.

16. The system of claim 14, wherein the credential strength assigned to the user device is used by the user device to access the network via different access points without the need to re-evaluate the credential strength of the user device.

17. The system of claim 14, wherein the identity provider uses one or more of user name/password, authorization token, device certificate, or SIM to authenticate the user device.

18. The system of claim 14, wherein the identity provider uses one or more of email, mobile phone, government identification, physical identification, local verification, or biometrics to authenticate the user device.

19. The system of claim 14, wherein the credential strength of the user device decays after a pre-determined period of time based on decay weights.

20. The system of claim 14, wherein an identity federation generates the respective strength ratings associated with each of the plurality of authentication methods.

* * * * *